United States Patent [19]

Andrews et al.

[11] Patent Number: 4,843,579
[45] Date of Patent: Jun. 27, 1989

[54] WEIGHING AND FILLING METHOD AND APPARATUS

[75] Inventors: James S. Andrews, Westminster; Daniel Cooper, Parker, both of Colo.

[73] Assignee: Hierath & Andrews Corp., Wheat Ridge, Colo.

[21] Appl. No.: 838,315

[22] Filed: Mar. 10, 1986

[51] Int. Cl.⁴ .............................................. G09F 9/32
[52] U.S. Cl. ................................. 364/567; 177/1; 177/25.19; 222/196; 222/200; 222/52; 198/771
[58] Field of Search .................. 364/567, 413, 478; 177/25, 25.19, 25.11, 25.12, 25.13, 1, 25.14, 50, DIG. 11, 116; 222/162, 196, 199, 200, 408, 408.5, 52, 56, 198; 198/771, 614

[56] References Cited

U.S. PATENT DOCUMENTS

| | | | |
|---|---|---|---|
| 3,091,301 | 5/1963 | Stone | 177/1 |
| 3,104,030 | 9/1963 | Howlett | 222/56 |
| 3,124,278 | 3/1964 | Cox | 222/196 |
| 3,224,515 | 12/1965 | Nowak, Jr. | 177/1 |
| 3,260,320 | 7/1966 | Clamp | 364/567 |
| 3,391,833 | 7/1968 | Plura | 222/200 |
| 3,439,759 | 4/1969 | Rouanet et al. | 222/56 |
| 3,578,955 | 5/1971 | Kloven | 364/567 |
| 3,752,244 | 8/1973 | Rouban | 177/1 |
| 3,828,869 | 8/1974 | Sellers | 177/1 |
| 3,834,473 | 9/1974 | Girard et al. | 177/25.19 |
| 4,023,021 | 5/1977 | Kuschel | 364/567 |
| 4,301,510 | 11/1981 | Ricciardi et al. | 364/567 |
| 4,378,078 | 3/1983 | Daniels | 222/183 |
| 4,381,545 | 4/1983 | Biddle, III et al. | 364/567 |
| 4,407,108 | 10/1983 | Craig | 177/25.12 |
| 4,431,070 | 2/1984 | Andrews | 177/50 |
| 4,431,071 | 2/1984 | Magat et al. | 177/149 |
| 4,448,272 | 5/1984 | Keller et al. | 177/25.19 |
| 4,522,500 | 6/1985 | Hyer | 222/199 |
| 4,576,526 | 3/1986 | Muller et al. | 222/56 |
| 4,583,605 | 4/1986 | Hirano | 177/50 |
| 4,619,336 | 10/1986 | Boyer et al. | 177/1 |
| 4,628,470 | 12/1986 | Baumann | 364/567 |
| 4,678,100 | 7/1987 | Gelinas et al. | 222/52 |
| 4,679,708 | 7/1987 | Spence | 222/161 |

Primary Examiner—Parshotam S. Lall
Assistant Examiner—S. A. Melnick
Attorney, Agent, or Firm—John E. Reilly

[57] ABSTRACT

A method and apparatus for rapidly and accurately dispensing measured amounts of powdered material from a vibratory feeder with a shaker rod extending through an orifice at the discharge end of the feeder and which rod undergoes reciprocal movement in response to vibration of the feeder to regulate the advancement of the powdered material. Alternate forms of control algorithms are employed in association with a computer to determine the optimum rate of feed and drive level for a given powder and feeder arrangement to result in a specific final weight within an acceptable tolerance for each fill cycle.

31 Claims, 6 Drawing Sheets

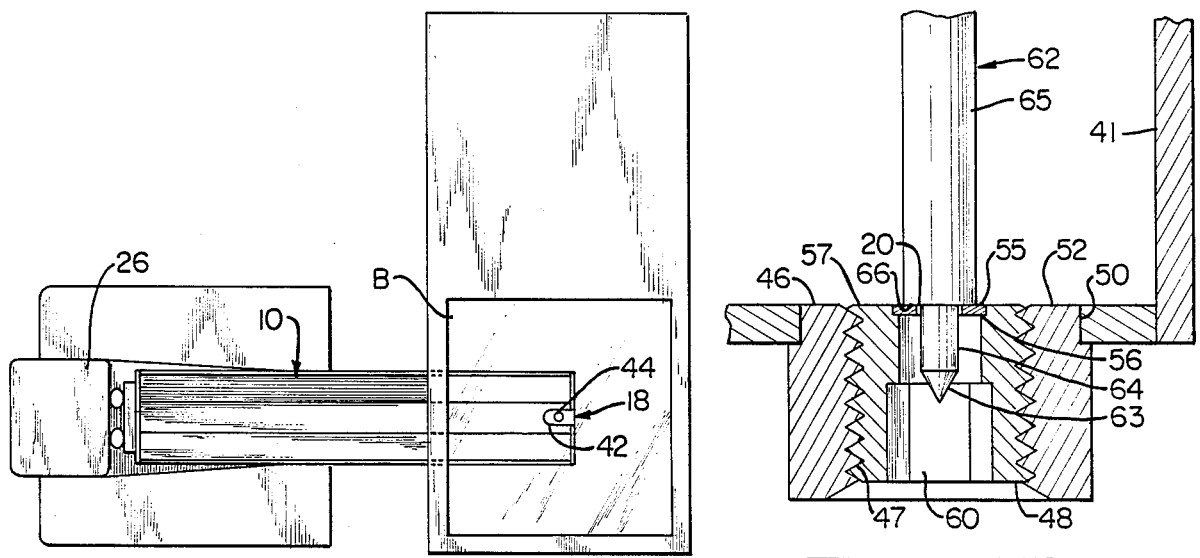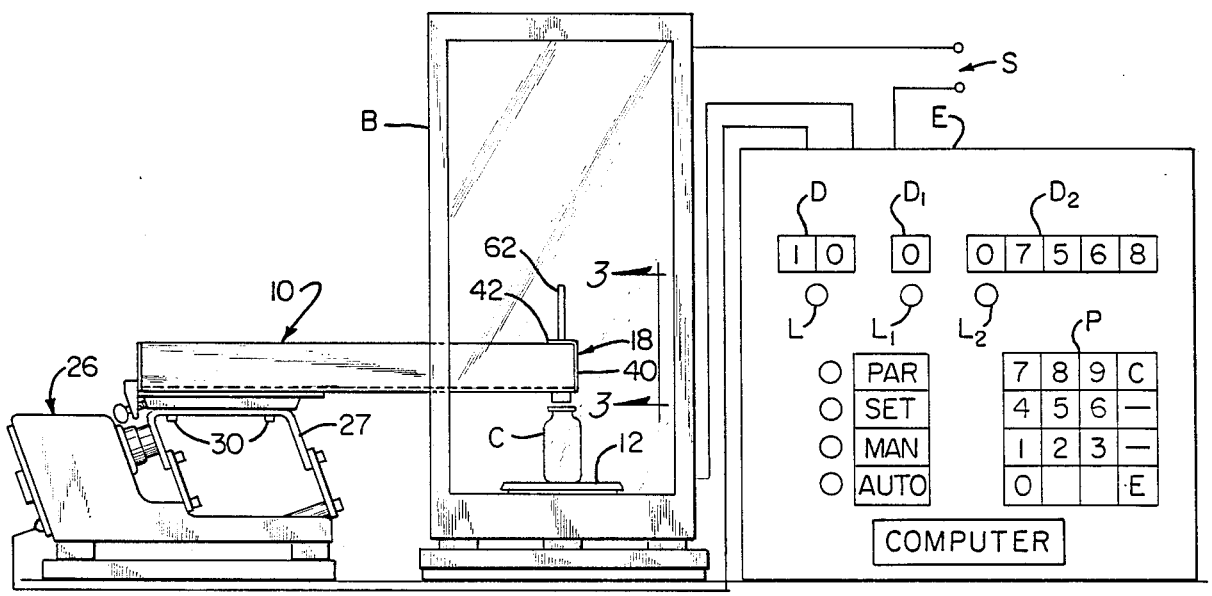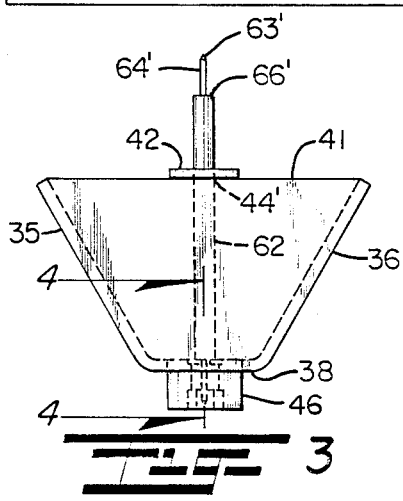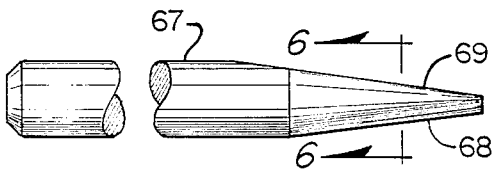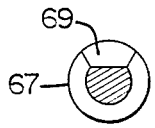

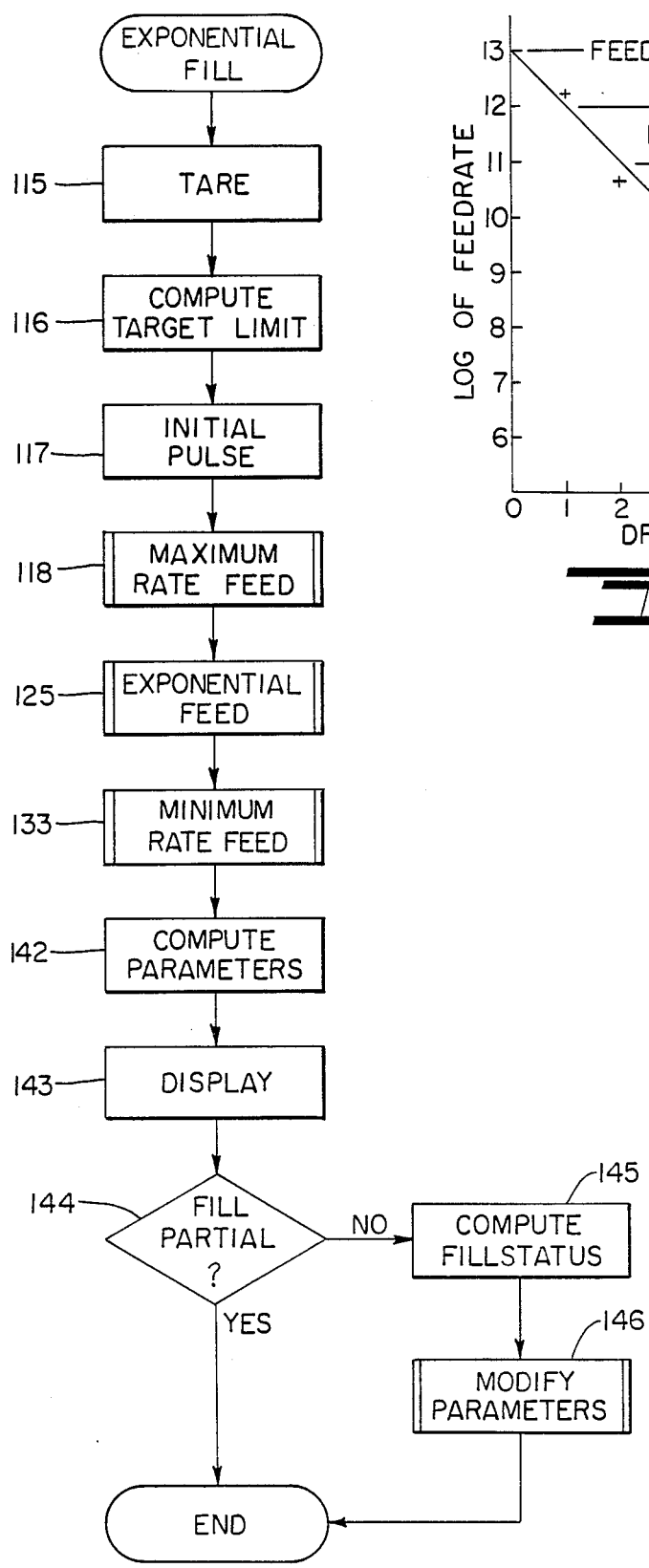
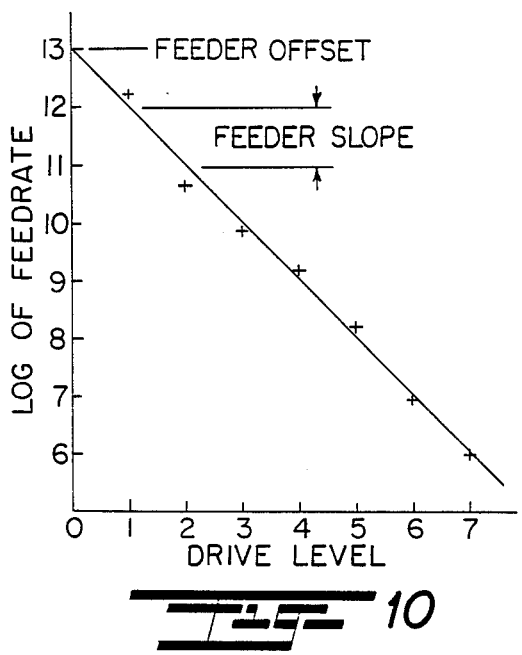
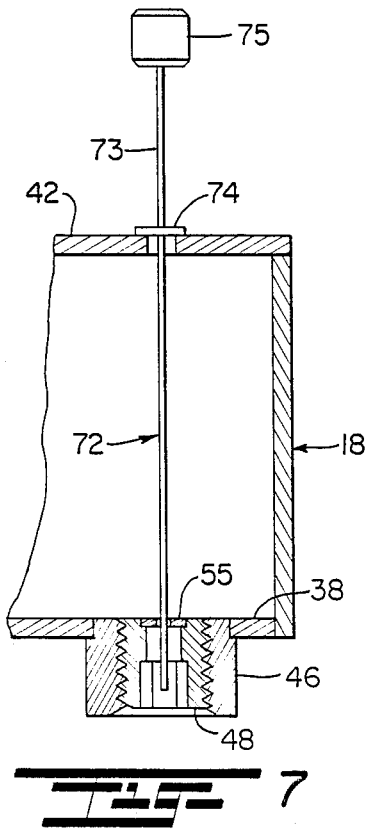

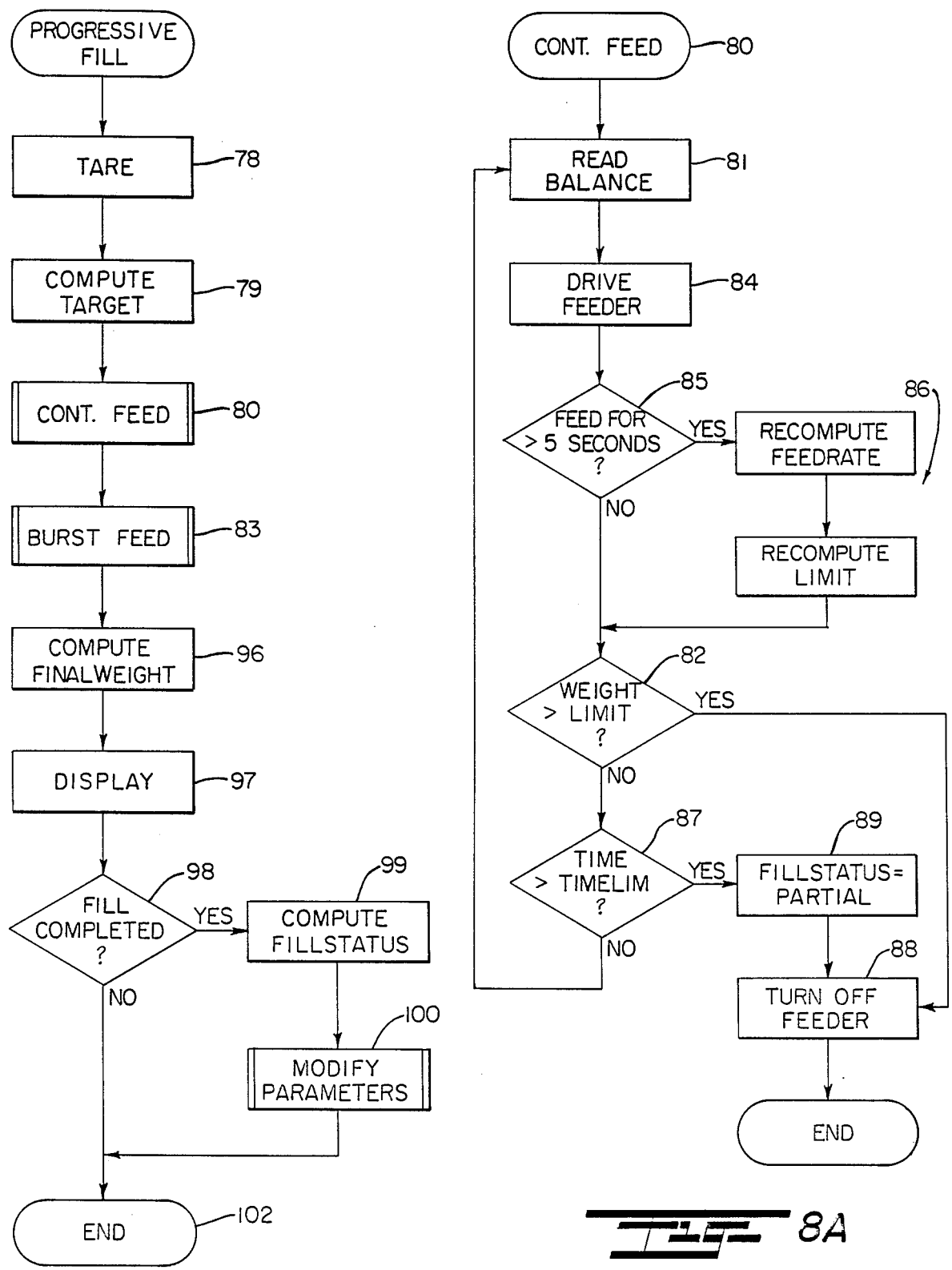

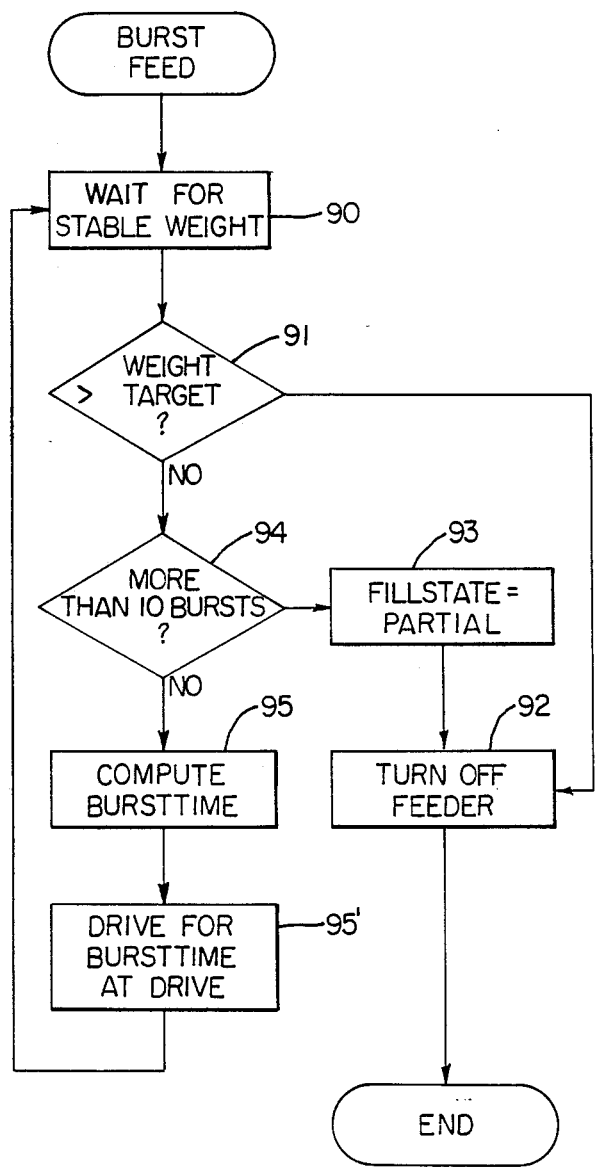
_Fig. 8B_
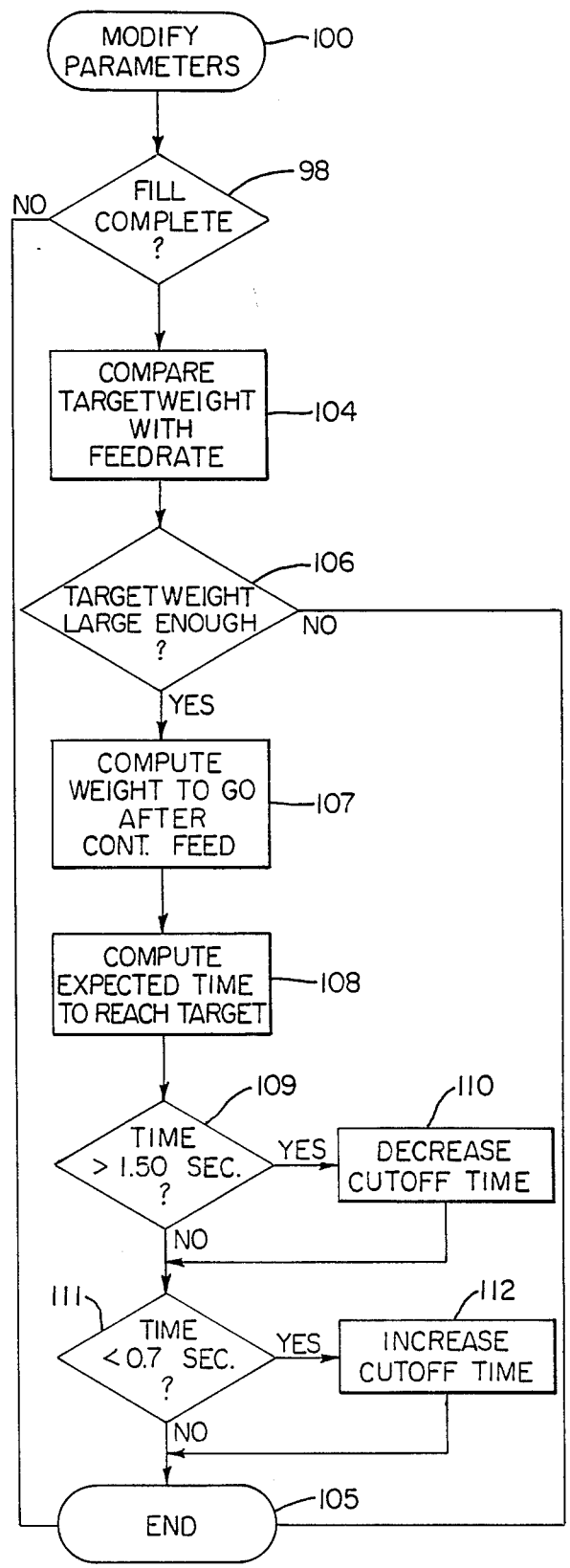
_Fig. 8C_

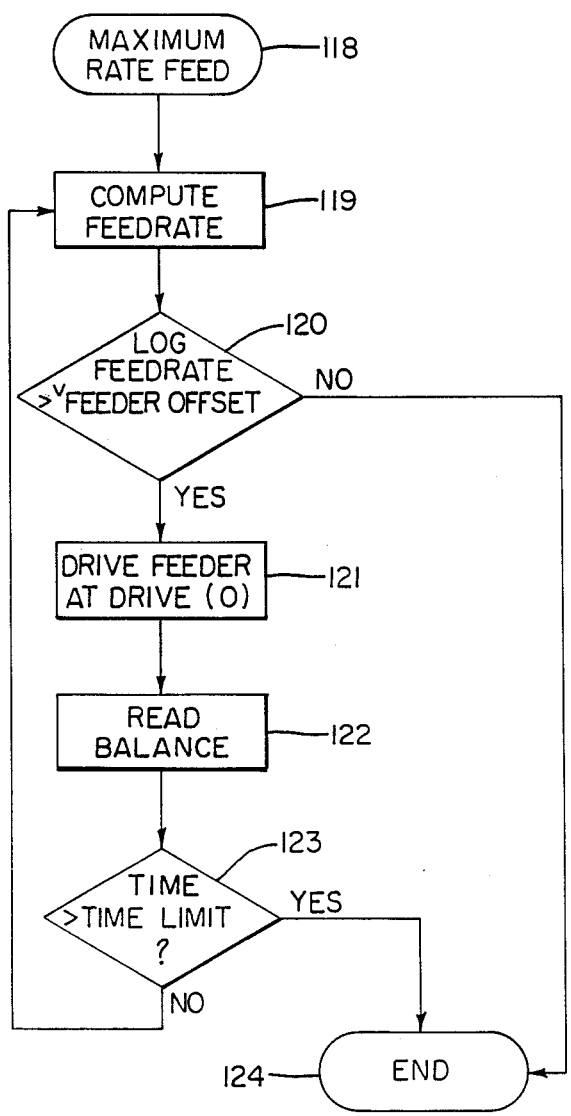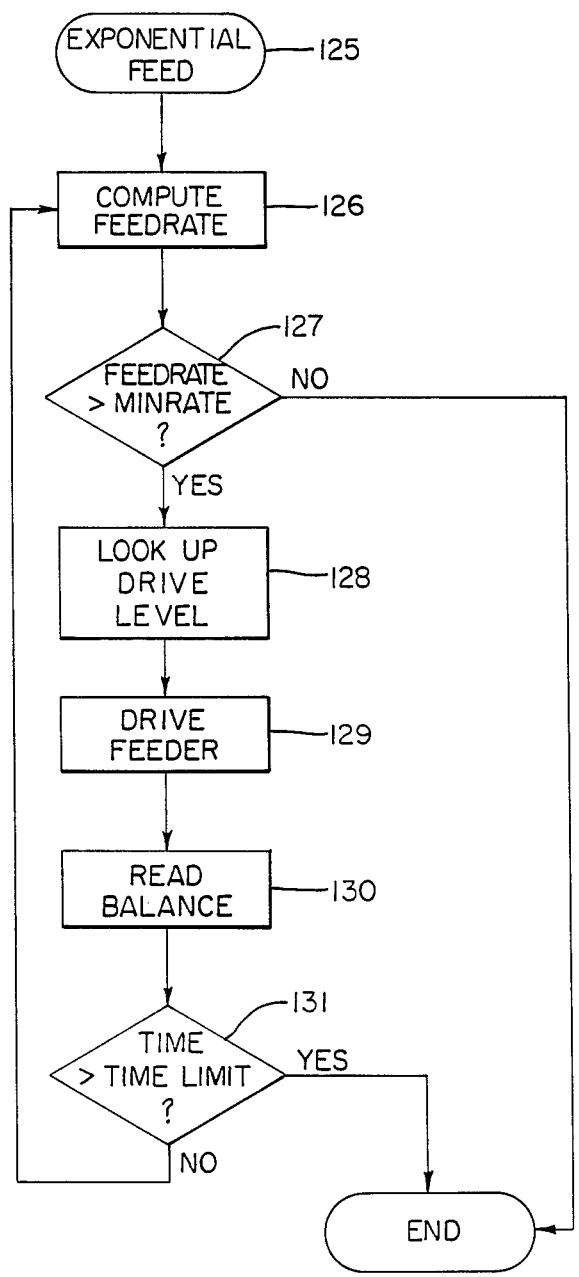
*Fig. 9A*
*Fig. 9B*

WEIGHING AND FILLING METHOD AND APPARATUS

This invention relates to weighing and filling apparatus, and more particularly relates to a novel and improved, program controlled apparatus for simultaneously weighing and dispensing measured, minute quantities of powdered material.

BACKGROUND AND FIELD OF THE INVENTION

Weigh/fill systems for dispensing measured amounts of powdered or comminuted materials demand special considerations from the standpoint of speed and accuracy of filling. Vibratory feeders are customarily employed in conjunction with a supply hopper as a source of the powdered material and which directs the material Onto one end of a shallow trough at the upper surface of a vibratory feeder. The vibratory feeder trough includes some form of reciprocal plunger which is operative to oscillate a spring-like support assembly for the trough so as to cause the material to be advanced horizontally toward the discharge end of the trough where it is deposited onto a weigh pan. Representative of commercially available vibratory feeder systems is the Model FTOC Vibratory Feeder manufactured and sold by Food Machinery Corporation of Homer City, Pa.

In U.S. Pat. No. 4,431,071, owned by the assignee of this application, there is disclosed a precision weigh/fill system for comminuted materials and which employs a vibratory feeder of the type described for the purpose of advancing the materials from the feeder trough into a rotatable weigh pan to which an unbalanced force is applied so as to cause the weigh pan to rotate through a predetermined angle to dump the contents into a tiltable discharge funnel. A weigh sensor is employed to weigh the material being fed into the pan and, depending upon accuracy or weigh tolerances, a discharge funnel is stationed beneath the weigh pan which is selectively tiltable to direct the material from the weigh pan either into a fill station or reject station. The system described has certain advantages in the respect that it is capable of sensing inaccuracies in filling without interrupting the dispensing operation as well as to minimize material losses and inaccurate fillings.

The present invention is concerned more with the accuracy and speed of fill from the vibratory feeder into a weigh pan or other receptacle. The practice of advancing powdered material horizontally along the trough and merely permitting it to drop off the end of the trough is not satisfactory either from the standpoint of speed or accuracy of filling: Certain powdered materials will tend to adhere to the end of the trough and not undergo even flow in their passage off the end of the trough. Flowability and particle size are important factors, also, and make it even more difficult to assure consistent filling. Still further, many powdered materials will tend to collect or lump together in their advancement along the trough.

It has been proposed in the past to employ programmed feed control systems to weigh the material as it is being filled and essentially employ real time feedback to establish the feeder cut-off point and to estimate the feeder cut-off point based on current readings of the weight. Thus, when the weighing system reaches a certain point ahead of a target weight, the feeder is stopped and if the system has currently estimated all related factors, such as, materials suspended in the air and weight not yet recorded due to time lag in the electronics, the final weight will be within the prescribed limits. However, it is desirable not only to minimize balance response as a factor in obtaining fill accuracy but to increase the speed and accuracy of filling by a combination of closely controlled rate of discharge of material with accurate readings of specific proportions of the total target weight at intervals throughout each fill cycle until the target weight is reached.

The advantages of adapting an automatic control system to an electronic laboratory balance for the purpose of accurately dispensing minute quantities of powdered material have been recognized for some time. Various attempts have been made to accomplish this with limited success due to the inherent operating characteristics of the typical electronic laboratory balance. In order to attain the high accuracy required, the electronic weight signal undergoes extensive electronic and digital filtering to reduce the influence of ambient vibration on the reported weight. The filtering process results in significant signal delay and relatively infrequent update of the registered weight. These two factors make it virtually impossible to utilize a typical feedback control system to regulate the flow of powder onto the weighing device as in earlier U.S. Pat. No. 4,431,070. A precision powder dispensing system requires a specific weight to be filled as well as. an accurate determination of the filled weight. Since the accurate determination of filled weight is inherent in a typical laboratory problem revolves electronic balance, the filling around controlling the powder feeding system in a manner that will produce a spebific final weight within an acceptable tolerance It is therefore proposed to provide a system which will greatly increase both the speed and accuracy of filling of powdered materials notwithstanding variations in flowability and particle size, is simple to operate and requires a minimum of operator assistance and is self-correcting to the extent of being substantially automatic.

SUMMARY OF THE INVENTION

Accordingly an object of the present invention is to provide for a novel and improved weigh/fill system and apparatus which is capable of rapidly and accurately dispensing measured amounts of powdered material.

It is another object of the present invention to provide for a novel and improved weigh/fill system which is conformable for use in accurately dispensing measured amounts of powdered materials of different particle size and flowability in a simple and highly economical manner.

It is a further object of the present invention to provide for a novel and improved low-cost vibratory feed mechanism for precisely weighing and filling powdered materials in which a programmable-controlled positive increment of feed is self-compensating with respect to variations in particle size and flowability while minimizing the use of feedback techniques.

A still further object of the present invention is to provide a precision weigh/fill system which can be regulated to positively feed a wide variety in sizes of powdered materials and wherein a program control circit may be quickly and automatically calibrated to provide the information needed for dispensing different types and sizes of materials.

An additional object of the present invention is to provide in a weigh/fill system for novel fill algorithms which are capable of optimizing performance of a vibratory feeder.

In accordance with the present invention, a preferred form of vibratory feeder apparatus has been devised for weighing and filling powdered materials wherein a horizontally disposed trough includes drive means for advancing powdered material along the trough toward a discharge end thereof, orifice means at the discharge end of the trough forming a downwardly directed opening for discharge of material therethrough, a valve member, such as, an elongated slender shaker rod extending through the orifice and support means for suspending the valve member in the orifice for vertically directed reciprocal movement in response to energization of said drive means. Preferably, the shaker rod is loosely suspended for gyratory motion with respect to the orifice by means of a suspension bracket. Different weights, sizes and shapes of shaker rods have been devised for use in association with different sized orifices depending upon the characteristics of the powdered material to be discharged.

Unique control algorithms have been devised for accurately dispensing selected, minute quantities of powdered material either in association with a vibratory feeder apparatus of the present invention or conventional feeders when employed in conjunction with an electronic laboratory balance. Conceptually, the control algorithms operate on the principle of establishing a target weight representing the cumulative weight of powdered material to be dispensed over a complete fill cycle, within a predetermined fill tolerance, establishing a feed rate representing the weight of material deposited with respect to time over the course of each fill cycle, computing the cumulative weight of material as it is being deposited with respect to time and determining from that computation the adjustment in feed rate required to deposit an additional incremental amount of material necessary to reach the target weight until the cumulative weight of material deposited reaches the target weight. In one form, a progressive fill algorithm in combination with programmable control causes the feeder to be driven at a constant rate and periodically interrupts the drive to weigh the cumulative weight deposited and compare with the desired weight; and as the cumulative weight approaches the desired weight, progressively reduces the time period over which the drive is activated based on weight-to-go after each preceding feed interval while making allowances for potential feed rate variation in order to avoid overshooting the target or desired weight.

An exponential fill algorithm has been devised which permits continuous feeding without interruption for periodic weighing and exponentially reduces the feed rate as a function of time as the cumulative weight actually filled approaches the desired weight thereby compensating for the inherent delays encountered in weighing with a conventional electronic laboratory balance.

Other objects, advantages and features of the present invention will become more readily appreciated and understood when taken together with the following detailed description in conjunction with the accompanying drawings, in which:

BRIEF DESCRIPTION OF THE DRAWINGS

FIG. 1 is a front view shown partially in section of a preferred form of weigh/fill system, including the control console, in accordance with the present invention;

FIG. 2 is a top plan view of the vibratory feeder apparatus without the control console, as illustrated in FIG. 1;

FIG. 3 is an end view of the vibratory feeder trough shown in FIG. 1;

FIG. 4 is an enlarged cross-sectional view taken about lines 4—4 of FIG. 3;

FIG. 5 is an enlarged view of a modified form of shaker rod;

FIG. 6 is a cross-sectional view of the shaker rod taken about lines 6—6 of FIG. 5;

FIG. 7 is a cross-sectional view of another modified form of discharge end and shaker rod;

FIGS. 8 to 8C are flow diagrams of fill routines employing the progressive fill algorithm of the present invention;

FIG. 10 is a grapn of FEED RATE versus drive level illustrating the application of "least squares fit" to measured calibration data.

DETAILED DESCRIPTION OF PREFERRED EMBODIMENT OF VIBRATOR FEEDER

Figure 9C:
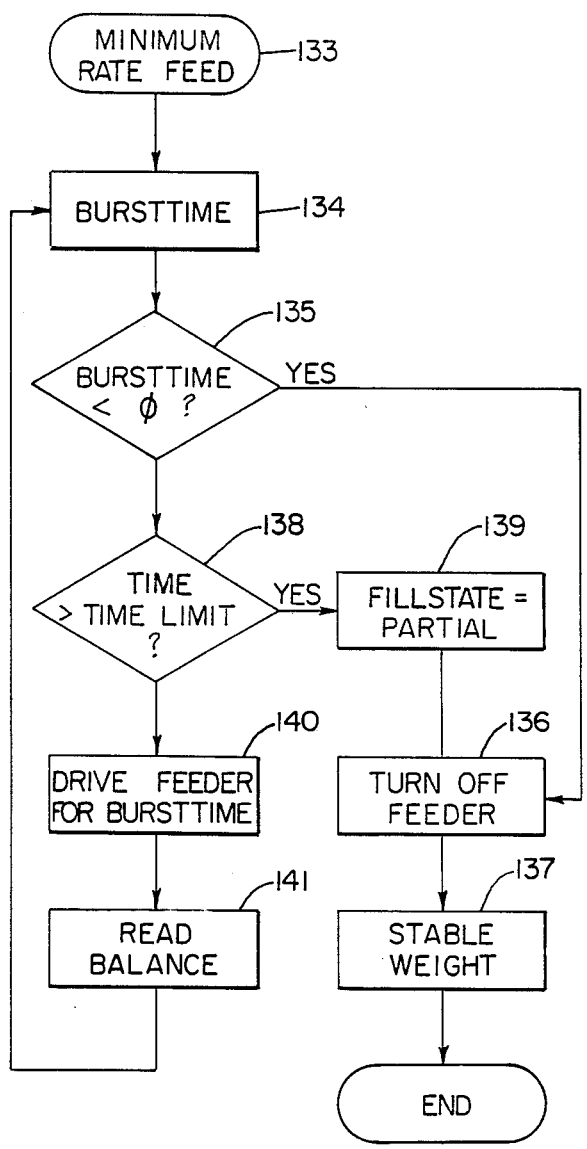
FIGS. 9 to 9D are flow diagrams of the fill routines utilizing the exponential fill algorithm of the present invention.

Referring in more detail to the drawings, there is shown in FIG. 1 the mounting of a preferred form of feeder trough 10 in conjunction with a container C disposed on a weigh pan 12. The pan 12 is positioned in a conventional balance enclosure B having a weigh sensor, not shown, to weigh material deposited from the discharge end of the feeder trough 10 into the container C. The feeder trough 10 receives powdered material from a supply source, not shown, the material being directed onto one end of feeder trough 10 for uniform flow and horizontal advancement at a consistent rate toward the discharge end. At the discharge end, a preferred form of feed mechanism 18 regulates the discharge of material from the feeder trough through orifice 20 into the container C, as shown in FIG. 4. The weigh balance B may be any of a number of commercially available precision weigh balances, such as, the Mettler Model AE 163 manufactured and sold by Mettler Instruments, A.G. of Zurich, Switzerland. Briefly, the weigh balance B is capable of sensing the weight of material in the container and of converting weight to electrical signals which are directed into a control console E, the console E having a logic system and associated program control circuit to be hereinafter described.

The vibratory feeder drive used in conjunction with the feeder trough 10 may itself be of conventional construction, such as, a Model FTOC Vibratory Feeder manufactured and sold by Food Machinery Corporation of Homer City, Pa. The vibratory feeder drive is broadly comprised of a reciprocal plunger 26 which oscillates a spring supported assembly 27 to impart an oscillatory motion to the feeder trough 10 causing the material deposited in the trough to be advanced horizontally toward the discharge end.

Considering in more detail the construction and arrangement of the feeder trough 10, one end of the trough as shown is firmly anchored to the spring-like support assembly 27 by fasteners 30, the trough having downwardly convergent sidewalls 35 and 36 which terminate in a flat bottom wall 38, as shown in FIG. 3. The discharge end has a mounting bracket 40 including a generally V-shaped end wall 41 conforming to the cross-sectional configuration of the trough to close off the discharge end of the trough and an upper horizontal extension flange or return 42 centered over the upper discharge end of the trough and provided with an opening 44. As show in FIG. 4, the bottom wall 38 of the trough at the discharge end has an enlarged opening therein for insertion of a nut 46, the nut being internally threaded as at 47 to receive complementary threading on an orifice screw 48. The nut has an upper reduced end portion 50 sized to correspond to that of the opening in the bottom wall 38 and which is permanently affixed by welding to the bottom wall so that the upper surface 52 of the nut is flush with the upper surface of the bottom wall.

The orifice screw 48 is annular in cross-section, and a flat waher-like element or annular plate 55 is pressfit into a groove 56 at, or slightly beneath, the upper end surface 57 of the screw. The annular plate 55 is machined to extremely close tolerances with a central opening defining the discharge opening or orifice 20 for gravity flow of powdered material from the discharge end into the container C. The orifice screw 48 is threaded into the nut such that its upper surface 57 is substantially flush with the upper surface 52 of the nut. An hexagonal socket 60 is provided at the lower and of the orifice screw to facilitate its insertion and removal.

The orifice 20 is aligned on a common vertical axis with the upper opening 44 of the mounting bracket and, to regulate the rate of flow of material through the orifice, a shaker rod 62 is inserted through the upper opening 44 and has a reduced end portion 64 sized for insertion through the orifice 20, the end portion 64 terminating in a lower tapered extremity 63. The reduced rod end 64 of the shaker rod is joined directly to main body in the form of an elongated cylindrical rod 65 which extends upwardly from a shoulder 66 at its juncture with the reduced end 64, the shoulder being adapted to seat on the orifice plate 55. In this way, when the trough is at rest, the shaker rod will close the orifice 20 to cut off the dischrrge of material into the container.

The shaker rod is of a weight to regulate the vertical motion or response of the shaker rod to vibratory action imparted to the feeder trough in a manner hereinafter described in more detail. The dimensions of the shaker rod 62 and orifice 20 are determined by testing to obtain optimum performance for a specific powder, fill size and fill tolerance. Thus, the ratio of the diameter of shaker rod 62 to the size of the orifice 20 may vary widely depending on the fill size, tolerance, flowability and particle size of the powder. As the vertical component of the drive vector tends to lift the shaker rod 62, the mass or weight of the shaker rod must be sufficient to prevent lift-out of the rod from the orifice plate 55 but not so great as to completely dampen the vertical motion of the rod, since it is the vertical motion of the rod which imparts a pumping action to drive the particles through the orifice. Moreover, the natural frequency of the shaker rod may be tuned by adjusting its length and weight so as to impart optimum gyratory action to the rod in response to oscillatory motion of the feeder trough. The gyratory action of the rod 62 in the orifice further enhances the pumping action and prevents the powdered material from building up around the edges of the orifice. In this regard, the edge thickness of the plate 55 surrounding the orifice 20 must be as thin as possible to avoid powder build-up around the edges. Since many industrial powders tend to stick and build up on the contact surfaces, the thinner the plate 55 the weaker the build-up structure and the easier it is for the gyratory action of the shaker rod to maintain a constant orifice size and produce a relativelv consistent or constant delivery rate.

In operation, the linear action of the feeder trough 10 will cause the powder to pile up at the discharge end of the trough so as to surround the shaker rod 62. The opening 44 in the guide bracket 42 is oversized with respect to the diameter of the shaker rod 62 so as to permit the rod to move freely relative to the feeder trough 10 in response to the vibratory action of the feeder drive system. Since the link of action of a typical vibratory feeder drive unit is inclined on the order of 20° above horizontal, the vertical component of the feeder drive force operates to lift the shaker rod 62 relative to the trough 10. As a result, a small amount of powder is metered through the peripheral clearance between the reduced end 64' and the orifice 20 with each pulse of the feeder drive. The amount of powder metered out is a function of the orifice 20, diameter of reduced end 64', the shaker rod mass[the feeder drive force and the characteristics of the powder. As noted earlier, selective variation of these factors enables close control over the feed rates of most finely divided materials to ±25% down to the milligram per second range. The orifice screw 48 is threaddely secured to the outer plug 46 whereby to provide a convenient means of changing the orifice size by substitution of plates 55 having different opening sizes therein. It will be noted that the shaker rod 62 is reversible and is provided with another reduced end portion 64' at its opposite end which may be of a different selected diameter than that of the reduced end portion 64' as described to permit modification of the feed rate.

DESCRIPTION OF MODIFIED FORMS OF VIBRATORY FEEDER

In the modified form of shaker rod illustrated in FIGS. 5 and 6, main body 67 of the rod is once again of elongated cylindrical configuration and terminates in a tapered end 68 provided with a flat surface 69, as best seen from the cross-sectional view of FIG. 6. The flat surface is formed by removal of a chordal segment along the length of the tapered end 68 so that when the tapered end 68 is positioned in the orifice 20, a slight clearance space is left between the tapered end 68 and the edge of the orifice. Again, the action of the shaker rod is a combination of vertical oscillation and rotation very much in the form of a gyratory movement so as to meter extremely small amounts of powder at consistent rates through the orifice without ogging.

Referring to FIG. 7, the discharge end 18 of the feeder is substantially identical to that of the preferred form and accordingly like parts are correspondingly enumerated. A modified form of shaker rod unit 72 includes an elongated slender wire-like rod or body 73, a stop 74 and an intermediate portion on the body 73 above the return portion 42 and a concentrated mass 75 at its upper extremity. In this form, the flexible rod 73 is preferably composed of piano wire which has sufficient springiness or resiliency that in combination with the mass 75 can oe tuned to provide a violent response to the exciting frequency of the feeder drive for purpose of keeping the powder agitated and advancing at a constant rate through the orifice. The rod is of uniform diameter throughout and accordingly the absence of a shoulder at the orifice opening 20 makes the shaker rod less satisfactory for freely flowing powders, since the powdered material may continue to flow after the feeder is stopped with resultant fill error. For this reason, it will be evident that the rod 73 may be provided with an alternate stop or shoulder adjacent to its lower end when necessary to effect a positive cut-off at the end of each fill cycle or at periodic intervals during the cycle.

DETAILED DESCRIPTION OF SYSTEM OPERATION

An appreciation of the operation of the system can be gained from a consideration of the control console logic system and the sequence of steps followed throughout a typical fill cycle. Referring to FIG. 1, the control console E is equipped with a standard 16-key pad P as illustrated together with program control buttons including a parameter control labeled "PAR" and a set-up control labeled "SET" used for calibration procedures only. A standard AC power source S is electrically connected to the trough 10, balance B and to the console E, as shown. In the console E, a manual control labeled "MAN" and an automatic control identified as "AUTO" are used in operating the system through each tare or file cycle. Function displays are represented at display D, a status display $D_1$ which lights up for good fill, and a value window $D_2$ to display values weighed. Indicator lights at L, $L_1$ and $L_2$ are positioned beneath each of the respective displays D, $D_1$ and $D_2$. By depressing the parameter switch "PAR", a desired fill tolerance and target weight may be entered at pad P and will be displayed by the value display D2. The system can then be activated to initiate the tare and fill cycles by depressing either the "MAN" or "AUTO" button. In the "MAN" mode, a control switch must be depressed to initiate each next succeeding cycle, but in the "AUTO" mode the system will continue to operate automatically through several cycles until manually shut off by the operator, interrupted only by the removal of a filled container and insertion of an empty container for each next fill cycle in succession. The computer programs as hereinafter described are stored in a conventional CPU or computer as represented at M, in the console E.

Broadly, two types of fill programs have been devised for the weighing and filling of powdered materials in accordance with the present invention: (1) progressive fill and (2) exponential fill. The progressive fill hereinafter described is specifically adaptable for use with apparatus of the type illustrared in FIGS. 1 to 7 in weighing finely divided powders or those which are difficult to advance at a variable rate; however, the exponential fill is intended more for use in weighing freely flowing materials as the rate of discharge is varied.

DETAILED DESCRIPTION OF PROGRESSIVE FILL PROGRAM

In FIGS. 8 to 8C, the flow diagrams illustrate the sequence of operations reguired to complete a fill and is adaptole for use with the positive discharge device illustrated in FIGS. 1 to 4 or the modified forms illustrated in FIGS. 5 to 7. The progressive fill program is characterized by regulating advancement of the material at a constant, preselected rate with periodic interruptions to accurately weigh the amount discharged at intervals within each fill cycle and to predict the cut-off point in approaching the end of the cycle within extremely close tolerances.

Broadly, the sequence of operations followed is to measure the tare weight, operate the feeder continuously for the maximum allowable period of time, followed by operating the feeder for a series of bursts of decreasing duration, the effect of which would be to produce a progressively reduced feed rate averaged over time, until the desired weiqht is recorded. The final weight is measured, related calculations are performed, after which the results of the fill are evalvated and the parameters adjusted to improve performance for future fills.

As illustrated in FIGS. 8 to 8C, the parameter definitions are as follows:

| | |
|---|---|
| ADJUSTRATE | Fine-tuning parameter; sets adjustment rate for automatic parameter adjustment. 0 = no automatic parameter adjustment. 1 = normal adjustment. |
| BURSTCOUNT | Number of pulse attempts to reach target. Maximum number is 9, then fill is aborted. |
| BURSTTIME | Time duration of feeder drive pulse. |
| CUTOFFTIME | Fine-tuning parameter; computes time to cut off continuous drive. |
| DRIVE | Drive level for feeder. |
| FASTFILLTIME | Time used by continuous feed. |
| FEEDRATE | Estimate of current feed rate for feeder. |
| FILLRATIO | Estimated fraction of weight-to-go; filled in each burst. |
| FILLSTATE | Keeps track of stages of fill. |
| FILLSTATUS | High, low, good or partial fill. |
| FILLTIME | Total time to complete a fill. |
| FINALWEIGHT | Actual weight of fill. |
| FINEFILLTIME | Time used by burst mode feed. |
| LIMIT | Weight at which to terminate continuous feeder drive. |
| READTIME | Time of most recent balance reading. |
| READWEIGHT | Value of most recent balance reading. |
| TAREWEIGHT | Weight of empty container. |
| T0 | Time at the start of Tare. |
| T1 | Time at the end of Tare. |
| T2 | Time at the end of continuous feeder drive. |
| T3 | Time at the end of pulsed feeding. |
| TARGET | Desired balance reading at end of fill. |
| TARGETWEIGHT | User parameter: Desired weight to be filled. |
| TIMELIM | Time at which continuous feed will be abandoned when feed rate is low. |
| TOLERANCE | User parameter: Allowable deviation from target weight for a fill. |
| W2 | Weight at end of continuous feeder drive, before balance has stabilized. |

W3 Weight at end of burst mode feeding.

In the progressive fill program, feeder calibration is performed as a preliminary to a filling operation to determine FEEDRATE at a selected drive level, or DRIVE. The calibration data may be stored for future use so that the procedure need not be repeated for each particular powder and feeder arrangement Feeder calibration is started by depressing "SET" button to initiate three seconds of continuous feed to establish a constant FEEDRATE; then the FEEDRATE is measured over a three-second interval This measured FEEDRATE is generally used only for the first fill and is revised during each subsequent fill, except for a fill small enough to require less than five seconds of feed.

Referring initially to FIG. 8, the feeder is tared at 78 until stable readings or values are obtained, for example, until three consecutive weight readings dirfer by less than one-half the fill tolerance, or TOLERANCE. Certain parameters are computed at 79 before the fill is started as follows:

TARGET=TAREWEIGHT+TARGET-
WEIGHT−TOLERANCE

LIMIT=TARGET−(FEEDRATE*CUTOFF-
TIME)

TIMELIM=T1+(2*TARGETWEIGHT/FEE-
DRATE)+(2* CUTOFFTIME)

Referring to FIG. 8A, the feeder enters a continuous feed loop 80 and is operated continuously until the weight as read at 81 exceeds LIMIT at 82. At that point, the weight will be close enough to TARGET to commence burst feeding at 83. Both during calibration and actual fill, the drive level or "DRIVE" is set at 83 at a constant level, and the feeder is activated or driven continuously at that level as designated at 84, during the entire continuous feed loop so as to result in a stable feed without causing the material to be shaken off the sides of the trough. If the continuous feed loop 80 takes more than five seconds as determined at 85, the actual feed rate will be computed at 86 each time a balance reading is received. The value so computed will replace the value measured during calibration. The time interval of five seconds has been found to be sufficient to reduce errors to an acceptable level when using a typical laboratory balance. As noted from FIG. 8A, if the duration of continuous feeding is greater than five seconds, the program enters a secondary loop at 86 to recompute FEEDRATE and LIMIT followed by returning to the main loop. FEEDRATE is recomputed according to the following equation:

FEEDRATE=(READWEIGHT-
−TAREWEIGHT)(READTIME-T1)

The weight reading is then compared with LIMIT at 82 and if greater than LIMIT the program is advanced to TURNOFF FEEDER 88; if the weight reading is less than LIMIT 81 the program is advanced to compare READTIME with TIMELIM at 87. TIMELIM 81 again is merely an outside factor which is established according to the equation as previously given under the algebraic relationships and beyond which it is desirable to terminate the fill cycle when FEEDRATE is too low. Accordingly, if the READTIME reading is grearer than TIMELIM at 87, the program is then advanced to FILLSTATE=PARTIAL at 89; however, if READTIME is less than TIMELIM at 87 the program is returned to the beginning of the loop and repeated until the weight reading exceeds LIMIT at 82.

When the weight reading exceeds LIMIT at 82 at the end of continuous feed, the feeder is turned off at 88. The program then returns to the main routine and enters the "burst feed" loop 83, as illustrated in FIG. 8B. The BURSTTIME parameter is determined according to the following equation:

BURSTTIME=FILLRATIO*(TARGET−
READWEIGHT)/FEEDRATE

The time duration of the feeder drive pulse, or BURSTTIME, essentially is the time required to feed a selected percentage of the weight of material remaining in order to reach TARGETWEIGHT. That percentage, or FILLRATIO, is typically on the order of 60%. In the burst feed loop shown in FIG. 8B, the feeder drive is interrupted long enough to obtain a stable weight value at 90 before the start of each burst. The actual weight reading is then compared with TARGET at 91 and, if greater than TARGET, the program is returned to the main loop via TURNOFF FEEDER at 92; if the weight is less than TARGET the number of bursts is counted at 94 and if greater than nine bursts the program is advanced via FILL STATE =PARTIAL 93 to TURNOFF FEEDER 92 and to end of loop.

Ten bursts are selected as an indication that the powder is not being fed properly or at a fast enough rate. If BURSTCOUNT is less than ten bursts, BURSTTIME is recomputed at 95 and the feeder is then driven for BURSTTIME at 95' and the program is returned to the beginning of the loop as indicated. This sequence is repeated until READWEIGHT exceeds TARGET and the program returned to the main routine, FIG. 8, where a computation is made of FINALWEIGHT, FILLTIME, FASTFILLTIME and FINEFILLTIME as designated at 96. The results are displayed at 97 following which a comparison is made of the weight with TARGET at 98. After the fill has been completed, the control program must wait for a stable weight reading in the same manner as for TARE. FINALWEIGHT is the difference between this reading and the TAREWEIGHT. Throughout the fill process, the times $T_o$, $T_1$, $T_2$ and $T_3$ for each stage or routine were recorded. These times are used to compute FASTFILLTIME, FINEFILLTIME and FILLTIME. If a good fill is indicated, the program advances to COMPUTE FILLSTATUS 99, followed by a "modify parameter" sequence 100. If fill is not completed, or, in other words, is a partial fill it is advanced to the end of fill cycle 102. If the fill has been properly complered, a display light will be energized on status display $D_1$ of the console sole E.

Referring to FIG. 8C, after a fill is completed, the parameters may be modified to improve the performance of subsequent fills. Any adjustments to be made are proportional to the parameter ADJUSTRATE. If ADJUSTRATE equals one, the adjustments are of a normal magnitude; if ADJUSTRATE equals zero, no adjustments are made.

Specifically, in the "modify parameter" sequence 100 as illustrated in FIG. 8C, a comparison is made of TARGETWEIGHT with FEEDRATE for a fixed time at 104; if TARGETWEIGHT is not large enough for a continuous feed stage to have occurred, the program is immediately advanced to the end of routine at 105, but if large enough as determined at 106 the program is advanced to compute the "weight-to-go" after "continuous feed" at 107. A computation is then made of expected time to reach TARGET at 108. If time is greater than 1.5 seconds as determined at 109, CUTOFFTIME is decreased at 110. If time is less than 0.7 seconds at 111, CUTOFFTIME is increased at 112 to the end of fill cycle 102. Thus, as noted, at the end of each fill cycle, the "modify parameter" routine will optimize the parameters or conditions for each next fill cycle. The first inquiry ascertains whether the cycle was aborted by reason of exceeding TIMELIM. If so, the rest of the parameter adjustment is bypassed and the program is returned to the beginning of the fill cycle program. The purpose of comparing with a particular time interval, such as, greater than 1.5 seconds and less than 0.7 seconds is to run the feeder at continuous feed or FASTFILLTIME for the maximum time interval before the cutoff point is reached and the program is converted into the BURSTTIME mode.

DETAILED DESCRIPTION OF EXPONENTIAL FILL PROGRAM

The exponential fill program is characterized by employing a variable speed drive and continuously feeding material during each fill cycle, progressively decreasing the drive level and the feed rate of material from a maximum feed rate at the beginning of the cycle to a minimum feed rate in approaching the end of each cycle, continuously weighing the materials dispensed as the feed rate is decreased, and comparing the actual weight dispensed with the desired weight to be filled. For convenience in understanding the exponential fill program control circuit, the parameter definitions are as follows:

| | |
|---|---|
| ADJUSTRATE | Fine-tuning parameter; sets adjustment rate for automatic parameter adjustment. 0 = no automatic parameter adjustment. 1 = normal rate of adjustment. |
| FEEDERSLOPE | Slope of feeder calibration curve in units of (log base 2 [feedrate]) per drive level. This parameter is determined by "least squares fit" to measured calibration data. |
| FEEDEROFFSET | Offset of feeder calibration curve at maximum drive level: log base 2 (feedrate, gm/sec). This parameter is determined by "least squares fit" to measured calibration data. |
| DRIVE(0 to 7) | Array of eight drive levels per calibration. These are adjusted during iterative calibration so that each drive level produces ½ the feedrate of the previous drive level. |
| FEEDRATE | Desired feed rate for feeder, gm/sec. |
| FILLTIME | Total measured time to complete a fill. |
| FINALWEIGHT | Actual weight of fill. |
| LIMIT | Weight at which to terminate feeder drive. |
| MINRATE | Minimum desired feed rate (unit weight/sec.) |
| FASTFILLTIME | Time used by sum of maximum rate of feed and exponential feed. |
| FINEFILLTIME | Time used by minimum rate feed. |
| FILLSTATUS | High, low, good or partial fill. |
| READTIME | Time of most recent balance reading. |
| READWEIGHT | Value of most recent balance reading. |
| BURSTTIME | Time duration of minimum feed. |
| TAREWEIGHT | Weight of empty container. |
| T0 | Time at the start of Tare. |
| T1 | Time at the start of maximum rate feeder drive. |
| T2 | Time at the start of exponentially decreasing drive. |
| T3 | Time at the start of MINRATE feeder drive. |
| T4 | Time at end of MINRATE feeder drive. |
| T5 | Time at end of fill. |
| TARGET | Desired gross weight at end of fill. |
| TARGETOFFSET | Weight subtracted from target to correct errors. |
| TARGETWEIGHT | User parameter: Desired net weight to be filled. |
| TARGETERROR | Difference between TARGETWEIGHT and actual fill weight. |
| TIMECONST | Fine tuning parameter: Exponential feed time constant, adjusted for stability. (Based on balance response time) |
| TIMELIMIT | Time at which the fill will be abandoned when FEEDRATE too low. |
| TOLERANCE | User parameter: Allowable deviation from TARGETWEIGHT for a fill. |
| W2 | Weight at start of exponentially decreasing drive. |
| W3 | Weight at the start of minimum rate feeder drive. |
| W4 | Weight at end of minimum rate feeder drive. |
| W5 | Weight at end of fill. |

For the expoential fill algorithm to function properly, the feed rate must be known over the full range of drive levels which will be used. In general the feed rate is a nonlinear function of drive level. Feeder calibraton is performed before a series of fills to determine this function. Again, the feeder calibration data may be stored for future use, eliminating the need to repeat the calibration procedure for a corresponding powder and feeder arrangement.

While powder is being filled the desired feed rate is computed at each point in time when a ba)ance reading becomes available. Then the drive level for the feeder is looked up using linear interpolation between the calibration drive levels. The relationship between the feeder calibration parameters to feed rate is illustrated in the graph of FIG. 10.

DRIVE(0) to DRIVE(7) are a set of eight drive levels used for feeder calibration. DRIVE(0) is selected by the operator to be as high as possible without spilling powder from the feeder trough. Each of the remaining seven drive levels is adjusted during the calibration procedure so that each drive level produces a feed rate one-half as great as that at the previous drive level.

FEEDEROFFSET and FEEDERSLOPE are the parameters which define a straight line relating the logarithm of feed rate to the calibration drive levels. The straight line is "least-squares fit" to the measured feed rates at the calibration drive levels. FEEDEROFFSET is the intercept of the straight line at DRIVE(0) and is approximated to the logarithm of the feed rate at the maximum drive level. FEEDERSLOPE is the slope of the line in units of log (feed rate) per drive level.

All logarithms are taken to the base 2 for convenience of calculation, but could be taken to bases other than 2. Using the base 2, FEEDERSLOPE is ideally equal to 1.

Feeder calibration is done in three iterations. After each iteration, the drive levels DRIVE(1) to DRIVE(7) are adjusted to more closely approximate the requirement that each drive level produces a feed rate one-half is great as that at the previous drive level. Each iteration starts with a three second feed at DRIVE(1) to level the powder bed. Then feed rates are measured at each of the eight drive levels. FEEDEROFFSET and FEEDERSLOPE are computed by performing a "least-squares fit" to the logarithms of the eight measured feed rates. Finally, the new drive levels are looked up using the newly computed calibration parameters.

As illustrated in FIG. 9, tare weight is measured at 115 before a fill is started. The program waits until the balance reports a stable reading. It additionally waits until three consecutive weight readings differ by less than one-half of the fill tolerance. Several values are computed at 116 before the fill is started, as follows:

TARGET=TAREWEIGHT+TARGET-
   WEIGHT−TARGETOFFSET

LIMIT=TARGET−TOLERANCE

TIMELIMIT=T1+(TARGETWEIGHT/(-
   ^2 FEEDEROFFSET) +(8*TIMECONST)

MINRATE=5*TOLERANCE/SECOND

An initial pulse is delivered at 117 to the feeder to loosen up the powder. Its drive level is set to produce a feed rate of (50 * MINRATE) and its duration is 0.05 seconds. The program then enters a secondary loop at 118, as illustrated in FIG. 9A, for a determination of maximum rate feed.

Referring to FIG. 9A, the desired feed rate is initially computed at 119 in the same manner as during exponentially decreasing feed. As long as the logarithm of the desired feed rate is greater than FEEDEROFFSET as determined at 120 the feeder is driven at the maximum drive level DRIVE(0) as at 121. As the weght, measured at 122, approaches the target the desired feed rate decreases. If TIME exceeds TIMELIMIT as determined at 123 the fill is abandoned because the feed rate was too low. When the logarithm of the desired feed rate ie less than FEEDEROFFSET at 120 it becomes possible to decrease the drive level to the feeder in which event the program proceeds to the end of Maximum Feed Rate at 124 and exponentially decreasing feed is commenced at 125. It is apparent that for a small fill exponentially decreasing feed is commenced without advancing through the Maximum Rate Feed loop.

Referring to FIG. 9B, during the exponentially decreasing feed portion of the filling operation the desired feed rate is proportional to the weight remaining to be filled as computed at 126. The desired feed rate is computed as follows:

FEEDRATE=(TARGET−READWEIGHT)-
   /TIMECONST

This produces an exponentially decreasing feed rate as time increases. Since the errors in weighing are proportional to the feed rate, the exponential reduction produces the fastesr possible filling while minimizing the risk of overshooting. If the desired feed rate is greater than MINRATE as computed at 127 the drive level is looked up at 128 from the graph, FIG. 10, the feeder is driven at that drive level as at 129 and the weight measured as at 130. TIME is compared with TIMELIMIT at 131 and, if less than TIMELIMIT the program returns to 126. When the desired feed rate is computed to be less than the preset minimum feed rate, exponentially decreasing feed terminates and the program returns to the main routine for MINIMUM RATE FEED computation at 133, FIG. 9C.

Referring to FIG. 9C, the fill is completed by feeding at a preset constant rate. For any arrangement of powder and feeder there is a minimum feed rate below which powder cannot reliably be moved. For the exponential fill algorithm a minimum feed rate has been set to be proportional to TOLERANCE. This allows a constant probability of filling outside of the tolerance, while approaching the target is fast as possible. If the minimum feed rate computed in this way is too small for powder to be reliably moved, the tolerance must be increased or the feeder arrangement must be changed.

During minimum rate feed the drive level is looked up using the predetermined minimum feed rate and the calibration data. The length of time remaining to drive the feeder is computed at 134 as follows:

BURSTTIME=(TARGET−READWEIGHT)/-
   MINRATE

If READWEIGHT is greater than TARGET at 135, i.e. BURSTTIME is less than zero, the program proceeds to TURNOFF FEEDER 136 and then to the end of loop at 137; but if the READWEIGHT is less than TARGET at 135, a comparison of TIME versus TIMELIMIT is made at 138. Again, if TIME is greater than TIMELIMIT, an indication of partial fill is made at 139 and the program proceeds via TURNOFF FEEDER 136 to the end of loop. FILL STATUS=PARTIAL at 139 operates as another way of indicating that the fill cycle was abandoned and there was not a complete fill. When TIME is less than TIME LIMIT at 138, the program is then advanced to DRIVE FEEDER FOR BURSTTIME at 140 and waits for a balance reading at 141.

In this way the feeder may be turned off at any point in the interval between balance readings. If the actual feed gate is the same as MINRATE the minimum rate feed will take an interval of time equal to TIMECONST.

After the fill has been completed the control program must wait for a stable weight reading at 137 in the same manner as for tare. The final fill weight, FINALWEIGHT, is the difference between this reading and the tare weight. Throughout the fill process the times T0 to T5 as defined are recorded. These tmes are used to compute FASTFILLTIME, FINEFILLTIME and FILLTIME at 142 previously defined and are displayed at 143. At 144 a check is made whether FILLSTATUS=PARTIAL. If FILLSTATUS is not equal to PARTIAL a computation is made at 145 of FILLSTATUS and is displayed in the status window $D_1$.

Figure 9D:
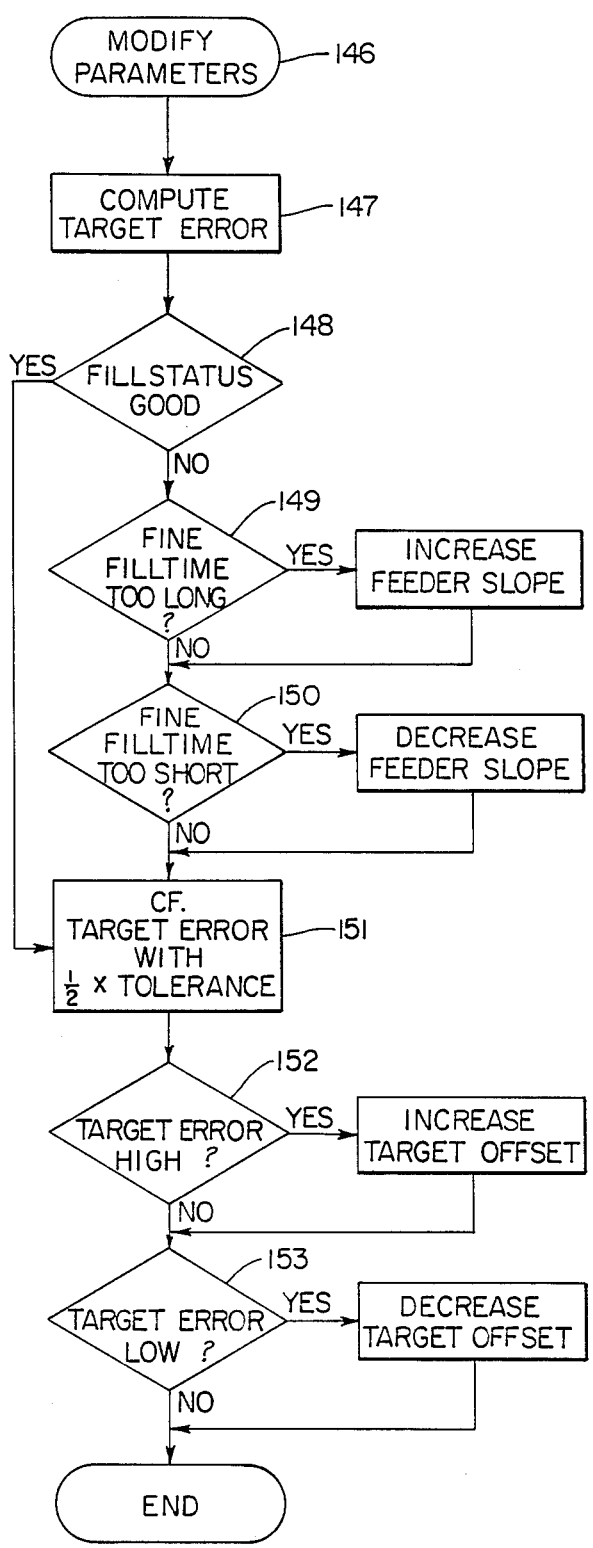

Referring to FIG. 9D, after a fill is completed parameters may be modified at 146 to improve performance of subsequent fills. A computation of TARGETERROR, or FINALWEIGHT less TARGETWEIGHT, is made at 147. After a determination of FILLSTATUS is made at 148 the computer will then advance either into determination of FINEFILLTIME at 149, 150 or a comparison of TARGETERROR with one-half TOLERANCE at 151. In the latter event, the program proceeds through a determination of whether the TARGETERROR was too low or too high at 152 and 153, respectively. Any adjustments which are made are proportional to the parameter ADJUSTRATE. If ADJUSTRATE =1 the adjustments are of a normal magnitude; if ADJUSTRATE =0 then no adjustments are made. FEEDERSLOPE is adjusted if necessary to correct the calibration of the feeder at low drive levels. FINEFILLTIME should be equal to TIMECONST if the actual feed rate is equal to the predicted feed rate. If FINEFILLTIME is off by more than +50% or −33% an adjustment is made to FEEDERSLOPE to correct the feecer calibration. If FINEFILLTIME was too long FEEDERSLOPE is increased. This has the effect of increasing the drive level for a given desired feed rate.

If FINEFILLTIME was too short FEEDERSLOPE is decreased. This has the effect of decreasing the drive level for a given desired feed rate. If the fill was outside of the acceptable tolerance the magnitude of the adjustment is ADJUSTRATE times 0.031. If the fill was within the acceptable tolerance the magnitude of the adjustment is one-fourth that value.

TARGETOFFSET is a correction factor which is employed to reduce any consistent error in fill size. If the actual fill weight differs from the desired fill weight by more than one-half times TOLERANCE as at 151 adjustment will be made. The magnitude of the adjustment is one-fourth times TOLERANCE times ADJUSTRATE. TARGETOFFSET is increased if the fill was larger than the desired weight. It is decreased if the fill was smaller than the desired fill weight.

From the foregoing, a maximum drive level is established at the start of the fill and a drive level which will produce a minimum feed rate, or MINRATE, at the end of the fill with intermediate drive levels therebetween which will progressively decrease between a maximum and minimum. Ideally, each reduction in drive level could be established at a FEEDRATE proportional to the weight remaining to be filled. However, in actual practice, FEEDRATE is subject to variation on account of differences in particle size, characteristics of different powdered materials and outside environmental conditions and does not vary directly with the drive level. Accordingly, in continuous or uninterrupted filling it is necessary to continuously weigh throughout the cycle and to make a determination in advance of the end of the cycle when and how often the drive level must be reduced and finally stopped at the end of the cycle for the most accurate fill. On account of the progressive reduction in FEEDRATE, the weighing becomes progressively more accurate as the target is approached. The actual weight changes as a function of READTIME according to the following equation:

READWEIGHT=TARGET−(TARGET-
WEIGHT*
e ∧ −[−(READTIME−$T_o$)]/TIMECONST)

The drive level D a employed in connection with vibratory feeder systems of the type described actually denotes the amplitude of oscillation or vibration of the feeder. Typically, the rate of oscillation would be on the order of sixty pulses per second and, in calibrating the system, the desired FEEDRATE is computed in mg/sec. In order to obtain fill accuracies on the order of 0.50 mg., MINRATE would be on the order of 2-3 mg/sec. but will necessarily vary depending on the particle size and consistency of material. In the calibration phase, a feed rate tolerance of ±10% is generally considered acceptable but not always attainable with less consistent powdered materials; and with certain materials it may be desirable to employ rattlers in the hopper or supply source to aid in loosening the material as a preliminary to depositing on the feeder trough, in accordance with conventional practice.

The present invention utilizes two different but related methods to accurately dispense powdered material with an electronic laboratory balance. Each method has specific characteristics and capabilities outlined as follows:

| Exponential Fill Method | Progressive Fill Method |
|---|---|
| 1. WEIGHING DEVICE | |
| Any electronic balance capable of weighing in the milligram range with the ability to communicate recorded weight to another device. | Same. |
| 2. TYPE OF MATERIAL | |
| Essentially free flowing powders. Example: Table salt | Finely divided powders not necessarily free flowing. Example: Powdered sugar |
| 3. FILL WEIGHT | |
| From upper range of typical laboratory balance down to 100 milligrams. | From 100 milligrams down to 1 milligram. |
| 4. FILL TOLERANCE | |
| ±2 in the least sigificant digit of the balance down to 2 milligrams or five times maximum particle weight. Example: 10.000 grams ± 0.002 grams | ±2 in the least significant digit of the balance down to .02 milligrams or five times maximum particle weight. Example: 2 milligram ± .02 milligram |
| 5. FINAL WEIGHT-TOLERANCE | |
| Same as electronic balance. | Same as electronic balance. |
| 6. FEEDING APPARATUS | |
| Conventional linear vibratory feeders in general | Linear vibratory feeder drive unit with positive control over discharge rate. |
| 7. CONTROL ALGORITHM | |
| A unique exponential algorithm based on the feedback principle and tailored to compensate for the output signal delays inherent with the typical electronic laboratory balance. Feed rate is exponentially reduced as the fill weight approaches the target weight so that balance reading becomes progressively more accurate. | A unique iteration algorithm computes the feed rate of the powder feeder and approaches target weight in a series of weigh steps. Each step feeds a computed weight of material based on feed rate performance of the previous step but always making allowances for potential feed rate variation so as to avoid overshooting the target weight range. Feed rate is essentially constant throughout the fill cycle. Speed of response of the balance does not affect accuracy of fill as the system pauses after each iteration until a stable balance reading is attained before starting next iteration. |

As the foregoing tabulation indicates, the present invention makes possible the adaptation of a typical electronic laboratory balance to the accurate dispensing of a wide variety of powdered materials utilizing the full range and capabilities of the balance used. Not only does the invention greatly reduce the time required to make a given fill as compared to pure manual methods, it improves fill accuracy due to elimination of operator skill, patience and fatigue factors, makes possible automated filling systems using robots and other automation machinery and is capable of making fills that are virtually impossible to accomplish with manual methods.

It is therefore to be understood that various modifications and changes may be made in the preferred and alternate forms of invention as herein set forth and described without departing from the spirit and scope thereof as defined by the appended claims.

We claim:

1. In an apparatus for weighing and filling powdered materials wherein a generally horizontally disposed trough contains said powdered materials and drive means are drivingly connected to said trough to incrementally advance said powdered materials toward a discharge section thereof, the improvement comprising:

orifice means at said discharge section of said trough forming a downwardly directed opening for discharge of said materials by gravity therethrough;

a valve member aligned with respect to the opening in said orifice means; and support means for suspending said valve member over said opening for vertically directed, reciprocal movement of said valve member with respect to said opening in response to activation of said drive in advancing the powdered materials through the opening.

2. In apparatus according to claim 1, said valve member being defined by a rod having a lower end of reduced diameter for extension through said opening, the relative size of said lower end and said opening being established in accordance with the particle size and flowability of said powdered material, said rod being of a weight sufficient to prevent accidental displacement of said rod upwardly from said opening in response to activation of said drive means.

3. In apparatus according to claim 2, said support means defined by a mounting bracket at the discharge section of said trough, said support means having an opening in vertically spaced, aligned relation to the opening in said orifice means for insertion of said rod through said aligned openings.

4. In apparatus according to claim 3, wherein said orifice means includes a thin plate having an upper surface disposed flush with the lower surface of said trough.

5. In apparatus according to claim 1, wherein said drive means oscillates said trough, said valve member being in the form of a rod of uniform diameter extending through the opening, and said support means guiding said valve member for gyratory motion in response to oscillation of said trough.

6. In apparatus according to claim 1, said valve member a valve seat movable into engagement with said orifice means to interrupt the flow of materials through said opening in response to deactivation of said drive means.

7. In apparatus according to claim 1, there being a plurality of orifice means having openings of different diameter for interchangeable, releasable connection to said trough, each said orifice means including a thin flat orifice plate in which an opening is formed.

8. In a vibratory feeder apparatus for weighing and filling powdered materials wherein a generally horizontally extending trough contains said powdered materials, and oscillating means are provided to oscillate said trough to incrementally advance said powdered materials toward a discharge end thereof, the improvement comprising:

orifice means at said discharge end of said trough including a downwardly directed opening for discharge of said powdered materials under gravity therethrough;

an elongated slender rod including a lower end portion extending downwardly through said orifice means; and rod support means including a bracket secured to the discharge end of said trough, said bracket including an opening in vertically spaced, aligned relation to the opening in said orifice means for the passage of said rod therethrough.

9. In a vibratory feeder apparatus according to claim 8, including an end wall disposed at the discharge end of said trough, said bracket being mounted on said end wall, and a stop member on said rod disposed above the opening in said bracket.

10. In a vibratory feeder apparatus according to claim 8, wherein said rod is in the form of a wire-like flexible member, a stop member being mounted on said rod above the opening in said bracket, and a mass being positioned at the upper end of said rod.

11. In vibratory feeder apparatus according to claim 8, said lower end of said rod tapering downwardly through the opening in said orifice means.

12. In vibratory feeder apparatus according to claim 8, said rod having a main body portion of a diameter greater than the diameter of the opening in said orifice means and said lower end of said rod being of reduced diameter with respect to the main body of said rod for extension through the opening in said orifice means.

13. In a vibratory feeder apparatus according to claim 12, there being a shoulder at the intersection of said main body of said rod with said reduced lower end, said shoulder movable into engagement with said orifice when said trough is at rest.

14. In a vibratory feeder apparatus according to claim 8, said rod including a main body of a diameter greater than that of the opening in said orifice means, said lower end of said rod tapering downwardly away from said main body to a diameter less than that of the opening in said orifice means for downward extension therethrough, and a recessed portion on the surface of said reduced lower end defining a clearance space between said reduced lower end and the surrounding edge of the opening in said orifice means for passage of powdered materials therethrough.

15. In an apparatus for weighing and filling powdered materials from a feeder having a trough in which said powdered material is deposited, drive means for vibrating said trough to advance said powdered material toward a discharge end thereof, and weight sensing means for weighing material deposited into a receptacle from said discharge end wherein a target weight represents the cumulative weight of powdered material to be deposited over a fill cycle within a predetermined fill tolerance and a feed rate is established which represents the weight of material to be deposited with respect to time during each fill cycle, the improvement comprising:

orifice means provided with a downwardly directed opening for depositing material from the discharge end of said trough, and an elongated shaker rod extending downwardly through the opening in said orifice means, said drive means imparting vertically directed, reciprocal motion to said rod via said trough;

said weight sensing means weighing the cumulative amount of material deposited at predetermined time intervals during each fill cycle; and programmable control means responsive to the cumulative weight of material deposited with respect to time during each fill cycle for determining at each said predetermined time interval the additional weight of material to be deposited and time required to deposit until the cumulative weight of material deposited reaches said target weight in each fill cycle.

16. In an apparatus according to claim 15, wherein said programmable control means includes means for establishing a maximum feed rate at the beginning of each fill cycle and means for establishing a progressively reduced feed rate to complete each fill cycle, means establishing a reference time for depositing the remaining weight of material at the progressively reduced feed rate whereby at the end of each fill cycle the actual time is compared with the reference time during the progressively reduced fed rate and if the actual time is greater than the reference time reduces the actual time of the progressively reduced feed rate for each next fill cycle in succession.

17. In an apparatus according to claim 16, in which said means for establishing a maximum feed rate is operative to increase the time interval for operating said feeder at the maximum feed rate at the beginning of each fill cycle an to reduce the actual time for the progressively reduced feed rate.

18. In an apparatus according to claim 15, wherein said programmable control means provides signals to activate said drive means at a constant amplitude of oscillation and deactivates said drive means at predetermined time intervals during the fill cycle to record the cumulative weight of material deposited at the end of each time interval.

19. In an apparatus according to claim 18, said drive means being deactivated at said predetermined time intervals to record stable weight readings.

20. In an apparatus according to claim 15, wherein said programmable control means activates said drive means at a plurality of preselected drive levels ranging from a maximum drive level to minimum drive level, selecting each drive level based on a non-linear function of the desired feed rate, the desired feed rate being reduced in proportion to the weight remaining to be filled in each fill cycle until the minimum drive level is reached.

21. In an apparatus according to claim 20, said programmable control means determining the desired feed rate according to the following algorithm:

$$\frac{\text{target weight} - \text{most recent balance weight reading}}{\text{time constant}}$$

wherein the time constant is based on balance response time.

22. A method of weighing and filling powdered materials in which said powdered materials are dispensed from a feeder in response to oscillation of said feeder, said feeder having drive means for oscillating said feeder at a plurality of drive levels between a maximum drive level and a minimum drive level, and a weight sensor is provided together with a computer for continuously weighing the material dispensed into a container and for determining when a desired weight of material has been dispensed into the container over a fill cycle, the steps comprising:

(1) calibrating said feeder for each different type of powdered material, desired weight to be filled and fill tolerance, and adjusting the drive level during each calibration step so that the feed rate is a percentage of each preceding feed rate in succession as the feed rate is decreased between the maximum drive level and the minimun drive level;

(2) entering into said computer the desired weight to be filled in a fill cycle (W), the fill tolerance representing the permissible variation between the actual weight filled ($W^1$) and the desired weight to be filled (W) and the time constant (K) representing the response time of the weight sensor;

(3) establishing a range of drive levels (D) at which said feeder is to be oscillated from said maximum to said minimum drive level;

(4) initiating a fill cycle in which materials are dispensed at a maximum drive level while continuously weighing the actual weight filled (W') of the materials dispensed;

(5) computing the desired feed rate (R) continuously throughout each fill cycle according to the following algorithm:

$$R = \frac{W - W'}{K}$$

and reducing the drive level (D) based on a non-linear function of said desired feed rate (R) until the minimum drive level is reached; and (6) driving said feeder at the minimum drive level while continuously comparing the actual weight filled ($W^1$) with the desired weight (W) until the actual weight filled ($W^1$) is equal to the desired weight (W) to be filled less a corrrection factor (F).

23. The method according to claim 22, step 4 including the steps of driving said feeder at the minimum drive level over a predetermined time period (T) computed as follows:

$$\frac{(W - F) - W'}{R_m}$$

wherein $R_m$ is the minimum desired feed rate selected according to the fill tolerance.

24. The method according to claim 22, including the step of exponentially decreasing the drive level in step (4) until the minimum drive level is reached.

25. The method according to claim 22, comprising the step of determining a correction factor for each fill cycle based on a comparison of actual weight filled with desired weight in each preceding fill cycle.

26. The method according to claim 22, further including the step of establishing a feeder calibration curve in units of log base 2 of the feed rate for each drive level and determining the drive level for each desired feed rate by least squares fit to measured feed rates at the calibration drive levels of step (1).

27. The method according to claim 26, inlcuding the step of establishing the maximum feed rate at the intersection of the feeder calibration curve and maximum drive level.

28. The method according to claim 26, comprising the further step (7) of modifying the slope of the feeder calibration curve if the actual feed rate in a preceding fill cycle is not equal to the desired feed rate by:

(a) increasing the slope of the calibration curve if the actual feed rate is less than the desired feed rate, and (b) decreasing the slope of said calibration curve if the desired feed rate is greater than the actual feed rate.

29. The method of weighing and filling powdered materials wherein said powdered materials are dispensed from a vibratory feeder, said feeder having drive means for oscillating said feeder at a predetermined drive level, and a weight sensor is provided together with a computer for continuously weighing the materials dispensed by said feeder into a container and for determining when a desired weight of material has been dispensed into the container over a fill cycle, the steps comprising:

(1) entering into said computer the desired weight to be filled in a fill cycle (W), entering the fill tolerance (F) representing the permissible variation between the actual weight filled (W') and the desired weight to be filled (W) and establishing a predetermined drive level (D) at which said feeder is to be oscillated during said fill cycle;

(2) calibrating said feeder prior to a fill cycle for each diferent type of powdered material by determining the feed rate for a given material when said feeder is driven at the predetermined drive level (B);

(3) initiating a fill cycle in which said feeder is oscillated at the predetermined drive level over a predetermined time interval necessary to dispense the desired weight (W);

(4) deactivating said drive means and weighing the material dispensed at the end of each step (3) until a stable weight reading is obtained;

(5) activating said drive means at the predetermined drive level over a time duration representing predetermined percentage of the time required to dispense a additional quantity of material necessary to each the desired weight (W);

(6) determining the cumulative weight of material dispensed and comparing the cumulative weight thereof recorded with the desired weight (W);

(7) repeating steps (5) and (6) until the actual weight dispensed is at least equal to the desired weight (W) less the fill tolerance (F).

30. The method according to claim 29, characterized by establishing a cut off time ror completion of the continuous feed interval during steps (3) and (4).

31. The method according to claim 30, including the step of optimizing the cut off time for the continuous feed interval in each fill cycle whereby to establish the minimum possible time for completing each fill cycle.

* * * * *

UNITED STATES PATENT AND TRADEMARK OFFICE
CERTIFICATE OF CORRECTION

PATENT NO. : 4,843,579

DATED : June 27, 1989

INVENTOR(S) : James S. Andrews and Daniel Cooper

It is certified that error appears in the above—identified patent and that said Letters Patent is hereby corrected as shown below:

Column 2   Line 32   Cancel "problem revolves electronic balance, the filling" and substitute -- -- electronic balance, the filling problem revolves --

Column 2   Line 34   Cancel "spebific" and substitute -- specific --

Column 4   Line 25   Cancel "grapn" and substitute -- graph --

Column 4   Line 29   Cancel "VIBRATOR" and substitute -- VIBRATORY --

Column 5   Line 21   Cancel "waher-like" and substitute -- washer-like --

Column 5   Line 30   Cancel "and" and substitute -- end --

Column 5   Line 45   Cancel "dischrrge" and substitute -- discharge --

Column 6   Line 17   Cancel "link" and substitute -- line --

Column 6   Line 26   Cancel "mass[the" and substitute -- mass, the --

Column 6   Line 56   Cancel "ogging" and substitute -- clogging --

Column 6   Line 67   Cancel "oe" and substitute -- be --

UNITED STATES PATENT AND TRADEMARK OFFICE
CERTIFICATE OF CORRECTION

PATENT NO. : 4,843,579
DATED : June 27, 1989
INVENTOR(S) : James S. Andrews and Daniel Cooper It is certified that error appears in the above-identified patent and that said Letters Patent is hereby corrected as shown below:

| | | |
|---|---|---|
| Column 7 | Line 65 | Cancel "adaptole" and substitute -- adaptable -- |
| Column 8 | Line 12 | Cancel "weiqht" and substitute -- weight -- |
| Column 8 | Line 14 | Cancel "evalvated" and substitute -- evaluated -- |
| Column 9 | Line 5 | Cancel "dirfer" and substitute -- differ -- |
| Column 9 | Lines 40, 41 | Cancel "FEEDRATE = (READWEIGHT-TAREWEIGHT)(READTIME -T1)" and substitute -- FEEDRATE = (READWEIGHT-TAREWEIGHT)/READTIME-T1 -- |
| Column 9 | Line 52 | Cancel "grearer" and substitute -- greater -- |
| Column 10 | Line 37 | Cancel "complered" and substitute -- completed -- |
| Column 12 | Line 23 | Cancel "ba)ance" and substitute -- balance -- |
| Column 12 | Line 58 | Cancel "logirithms" and substitute -- logarithms -- |
| Column 13 | Line 44 | Cancel "fastesr" and substitute -- fastest -- |

UNITED STATES PATENT AND TRADEMARK OFFICE
CERTIFICATE OF CORRECTION

PATENT NO. : 4,843,579

DATED : June 27, 1989

INVENTOR(S) : James S. Andrews and Daniel Cooper

It is certified that error appears in the above-identified patent and that said Letters Patent is hereby corrected as shown below:

| | |
|---|---|
| Column 14 Line 23 | Cancel "gate" and substitute -- rate -- |
| Column 14 Line 60 | Cancel "feecer" and substitute -- feeder -- |

CLAIMS:

Column 17:

| | |
|---|---|
| Claim 6 Line 38 | After "ber", insert -- having -- |

Column 19:

| | |
|---|---|
| Claim 16 Line 5 | Cancel "fed" and substitute -- feed -- |
| Claim 20, line 28 | After "to", insert -- a -- |

Column 21:

| | |
|---|---|
| Claim 29 line 13 | Cancel "diferent" and substitute -- different -- |

UNITED STATES PATENT AND TRADEMARK OFFICE
CERTIFICATE OF CORRECTION

PATENT NO. : 4,843,579

DATED : June 27, 1989

INVENTOR(S) : James S. Andrews and Daniel Cooper

It is certified that error appears in the above-identified patent and that said Letters Patent is hereby corrected as shown below:

Column 22:

Claim 30 Line 16   Cancel "ror" and substitute --for--

Signed and Sealed this

Twentieth Day of November, 1990

Attest:

HARRY F. MANBECK, JR.

*Attesting Officer*   *Commissioner of Patents and Trademarks*